(12) United States Patent
Yu et al.

(10) Patent No.: US 6,599,023 B2
(45) Date of Patent: Jul. 29, 2003

(54) OPTICAL ISOLATOR

(75) Inventors: Tai-Cherng Yu, Tu-Chen (TW); Ju Jn Dy, Tu-Chen (TW); Chun Yu Lee, Tu-Chen (TW); Chien-Cheng Chen, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 2 days.

(21) Appl. No.: 09/930,834

(22) Filed: Aug. 15, 2001

(65) Prior Publication Data

US 2003/0012517 A1 Jan. 16, 2003

(30) Foreign Application Priority Data

Jul. 10, 2001 (TW) ........................................ 90211580 U

(51) Int. Cl.⁷ ................................................. G02B 6/38
(52) U.S. Cl. ............................ 385/73; 385/34; 385/35; 385/58; 385/77; 385/74; 385/93
(58) Field of Search ............................. 385/34, 35, 58, 385/77, 74, 93, 73

(56) References Cited

U.S. PATENT DOCUMENTS 5,661,829 A * 8/1997 Zheng ........................... 385/33
5,734,762 A * 3/1998 Ho et al. ....................... 385/11
6,168,319 B1 * 1/2001 Francis ......................... 385/79

* cited by examiner

Primary Examiner—Robert H. Kim
Assistant Examiner—Richard Kim
(74) Attorney, Agent, or Firm—Wei Te Chung

(57) ABSTRACT

An optical isolator includes a first collimator, a second collimator and an isolation assembly arranged between the collimators. The first collimator includes a first capillary retaining an input fiber and a first GRIN lens received and retained in a first glass sleeve. The isolation assembly includes two birefringent crystal wedges with an optical rotator interposed between the birefringent crystal wedges. A magnetic ring receives and retains the birefringent crystal wedges and the optical rotator together. The second collimator includes a second capillary retaining an output fiber and a second GRIN lens which are received and retained in a second glass sleeve. A first stainless steel sleeve receives and retains the first glass sleeve and the isolation assembly together while a second stainless sleeve is fit over the second collimator. Apertures are defined in the first stainless steel sleeve. An end of the second stainless steel sleeve is sized to snugly fit into the end of the first stainless steel sleeve and thus properly aligns the collimators with each other. A portion of the second stainless steel sleeve underlaps the apertures of the first stainless sleeve. Welding is performed through the apertures to permanently secure the two stainless steel sleeves together.

9 Claims, 4 Drawing Sheets

OPTICAL ISOLATOR

BACKGROUND OF THE INVENTION

1. Field of the Invention

The present invention relates to an optical isolator and particularly to an optical isolator capable of self-alignment.

2. Description of Related Art

Optical isolators are key elements in optic communication systems in which optical signals are produced by lasers, such as semiconductor lasers. In a projected information highway system, for example, semiconductor lasers are employed in transmitters to produce forward directed optical signals. As is well known, the optical signals produced by such lasers may carry different kinds of information, such as digital, analog, or combined format.

The semiconductor lasers are susceptible to light signal reflections and adverse effects, such as optical wavelength jitter, laser output intensity noise, and uncontrolled optical power modulations are caused.

Uncontrolled optical power modulation leads to a non-linear laser transfer function which represents the relationship between laser drive current and output optical power. This causes an infidelity representing the electrical signal (RF) with a distorted optical signal, which may cause errors in the operation of connected circuitry, such as decision making circuitry to misidentify an intended one state for a zero state. In the case of analog systems, such as multi-channel television (TV) systems, non-linearity in the laser transfer function may cause interference between channels.

Laser output intensity noise is induced with laser operation subject to undesired optical return, which degrades the TV signal to noise ratio and as a result reduces picture quality. An optical wavelength jitter transmitting in an optical fiber further produces TV signal distortion due to signal dispersion, as the optical signals propagate along the path of an optical fiber.

In the case of digital systems, information is carried by bit symbols at a rate of 2.4 billion bits per second (i.e. 2.4 Gb/s) or higher. At such rates, the bit to bit spacing becomes progressively more limited. As optical signal bits progress along the length of an optical fiber, the bits are subject to dispersion, which reduces the signal level of the bits. The reduced signal level results in an increased bit error rate. Signal dispersion causes a spreading of the signal and results in bit overlap. The overlapping of bits in turn causes a high bit error rate and reduces fidelity in the transmission of information.

Accordingly, it is desirable to block the reverse or return transmission of optical signals back to a laser transmitter while providing low attenuation at the forward direction.

Further, it is desirable to reduce undesired levels of reflected optical power in optical systems incorporated in communication systems and in the information super highway.

An optical isolator is used with fiber optic amplifiers in optical systems to prevent oscillation due to reflection and to prevent injection of spontaneous optical emissions to the laser transmitter originally producing the optical signals. Optical interference noise effects such as the spontaneous emissions can occur at a reflection level of one part per million (i.e., below 60 dB) of light. The interference noise will increase transmission noise of the fiber optic transmission system resulting in reducing signal to noise ratio and signal distortion.

An optical isolator consists of a number of elements, which typically include a first GRIN lens, a first birefringent crystal wedge, an optical rotator, a second birefringent crystal wedge and a second GRIN lens The first GRIN lens receives and converges rays emitted from an input optical fiber into parallel rays. The first birefringent crystal wedge split the parallel rays into a first ray polarized along the optical axis and a second ray polarized perpendicularly to the optical axis. The second birefringent crystal wedge recombines the first ray and the second ray The second GRIN lens focuses the recombined rays into an output optical fiber The optical rotator is mounted between the first and the second birefringent crystal wedges for rotating the first ray and the second ray 45?at the same direction. The rays reflected from the output optical fiber will be diverged by the isolator and cannot be focused into the input optical fiber.

The elements of the optical isolator must have precise relative orientation with respect to each other in order to achieve the desired performance. This complicates the assembling process of the optical isolator. Thus a variety of methods have been developed for realizing efficient assemble of the optical isolators.

U.S. Pat. No. 5,446,813 discloses a conventional optical isolator capable to prevent ray reflected from output fiber from focusing into input fiber. As shown in FIG. 1 of the attached drawings, the optical isolator shown in U.S. Pat. No. 5,446,813, designated with reference numeral 10 comprises two standard collimators 20, 40 and an isolation assembly 30. Each collimator 20, 40 comprises a capillary 22 retaining an end of an optic fiber 21, 41, a GRIN lens 23 and a glass sleeve 24, wherein the capillary 22 and the GRIN lens 23 are respectively received in the glass sleeve 24. To hold and protect the collimator 20, the glass sleeve 24 is received in a copper sleeve 25. The isolation assembly 30 includes first and second birefringent crystal wedges 31, 32, an optical rotator 33 mounted between the crystal wedges 31, 32 and a magnetic ring 34 mounted between the first and the second birefringent crystal wedges 31 and 32 The isolation assembly 30 is retained in a copper sleeve 36 for protection.

To assemble, the copper sleeves 25, 36 are all fit into a stainless steel sleeve 55 and a bonding agent, such as epoxy, is applied between the copper sleeves 25, 36 and the stainless steel sleeve 55. A bonding agent is then cured to secure the sleeves 25, 36, 55 together. Curing the bonding agent by heat may cause relative displacement between the copper sleeves 25, 36 and the steel sleeve 55 and consequently poor alignment between the elements of the optical isolator.

Furthermore, the conventional optical isolator has a complicated structure and is thus difficult to manufacture.

It is desired to provide an improved structure of optical isolator for alleviating the above problems.

SUMMARY OF THE INVENTION

Accordingly, an object of the present invention is to provide an optical isolator having a simple structure for allowing easy and efficient assembly.

Another object of the present invention is to provide an optical isolator having excellent alignment result.

In accordance with the present invention, an optical isolator is provided, comprising a first collimator, a second collimator and an isolation assembly arranged between the collimators. The first collimator comprises a first capillary retaining an input fiber and a first GRIN lens received and retained in a first glass sleeve. The isolation assembly comprises two birefringent crystal wedges with an optical rotator interposed between the birefringent crystal wedges. A magnetic ring receives and retains the birefringent crystal wedges and the optical rotator together. The collimator comprises a second capillary retaining an output fiber and a second GRIN lens which are received and retained in a second glass sleeve. A first stainless steel sleeve receives and retains the first glass sleeve and the isolation assembly together while a second stainless sleeve is fit over the second collimator. Apertures are defined in the first stainless steel sleeve. An end of the second stainless steel sleeve is sized to snugly fit into the end of the first stainless steel sleeve and thus properly aligns the collimators with each other. A portion of the second stainless steel sleeve underlaps the apertures of the first stainless sleeve. Welding is performed through the apertures to permanently secure the stainless steel sleeves together.

DETAILED DESCRIPTION OF PREFERRED EMBODIMENTS

Figure 1:
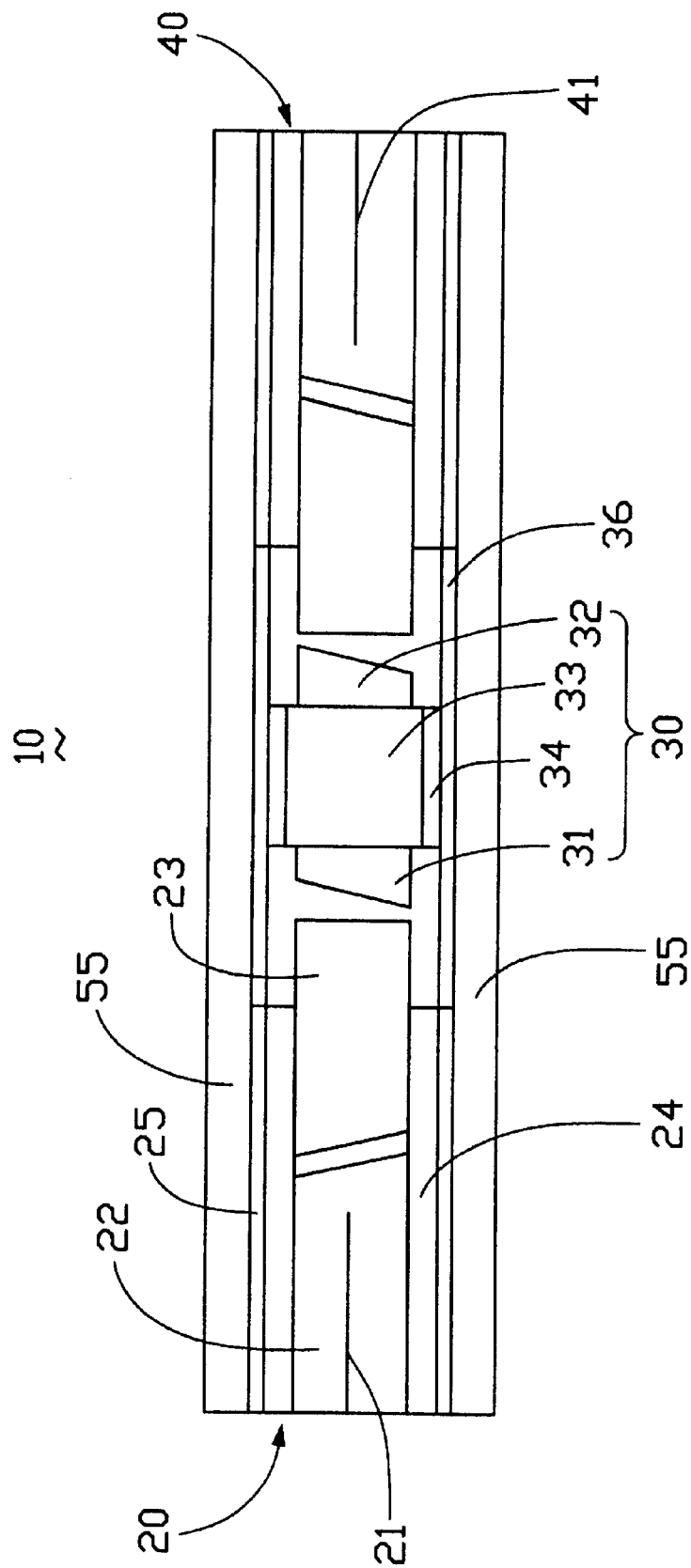
FIG. 1 is a cross-sectional view of a conventional optical isolator.
Figure 2:
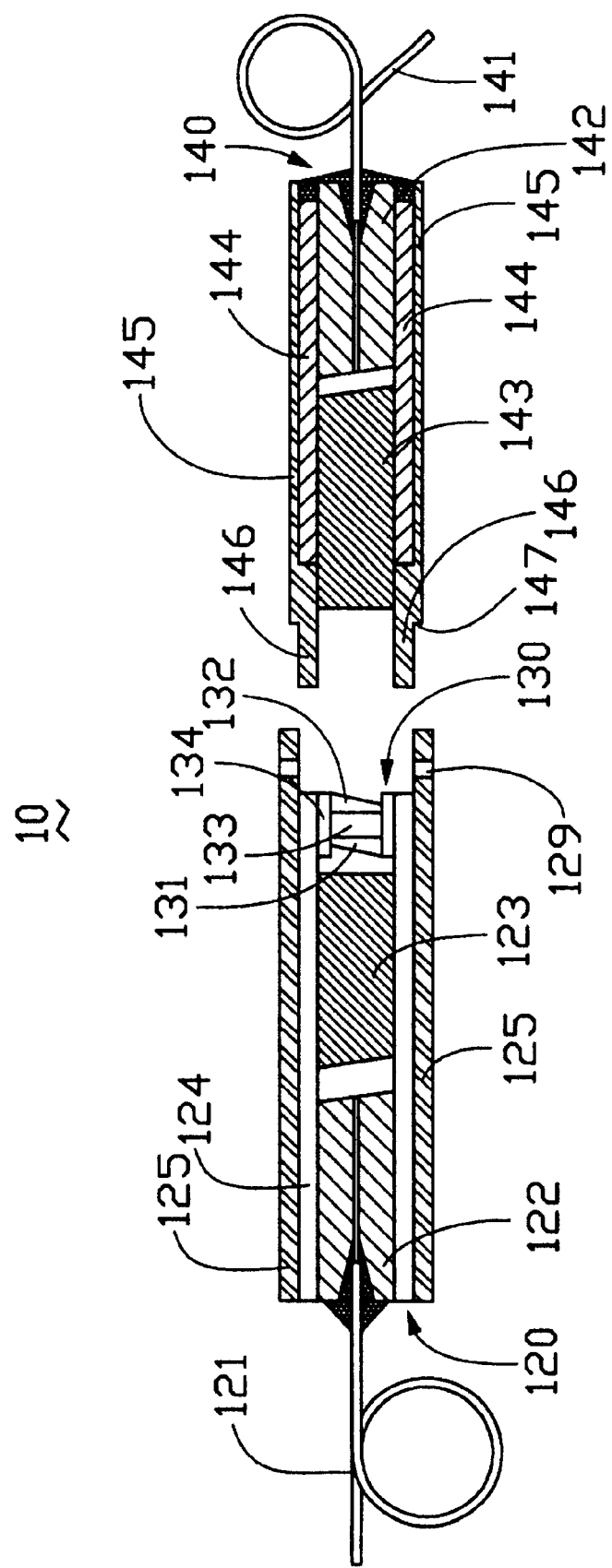
FIG. 2 is a cross-sectional view of an optical isolator constructed in accordance with a preferred embodiment of the present invention.

Referring to FIG. 2, an optical isolator constructed in accordance with the present invention, generally designated with reference numeral 10 comprises a first collimator 120, an isolation assembly 130 and a second collimator 140 arranged serially in an axial direction. The first collimator 120 comprises a first capillary 122 retaining an end of an input optical fiber 121, a first GRIN lens 123 and a first glass sleeve 124. The first capillary 122 and the first GRIN lens 123 are received and retained in the first glass sleeve 124. The first lens 123 receives and converges rays emitted from the input optical fiber 121 into parallel rays.

The isolation assembly 130 is received in the first glass sleeve 124 of the first collimator 120, and comprises first and second birefringent crystal wedges 131, 132, an optical rotator 133 mounted between the first and second birefringnet crystal wedges 131, 132, a magnetic ring 134 fitting over and retaining the optical rotator 133 and the birefringent crystal wedges 131, 132 together. The first birefringent crystal wedge 131 splits the parallel rays into a first ray polarized along the optical axis thereof and a second ray polarized perpendicular to the optical axis. The optical rotator 133 rotates the first and the second rays an angle of 45 degrees at the same direction. The second birefringent crystal wedge 132 recombines the first and second rays. The isolation assembly 130 makes rays reflected from output optical fiber 141 diverged and thus preventing the rays from being focused into the input optical fiber 121 thereby isolating the input optical fiber 121 from the reflected rays.

The second collimator 140 comprises a second capillary 142 retaining an end of output optical fiber 141, a second GRIN lens 143 and a second glass sleeve 144. The second glass sleeve 144 receives and retains and thus protects the second capillary 142 and the second GRIN lens 143. The second collimator 140 focuses the recombined rays from the second birefringent crystal wedge 132 into the output optical fiber 141.

Figure 3:
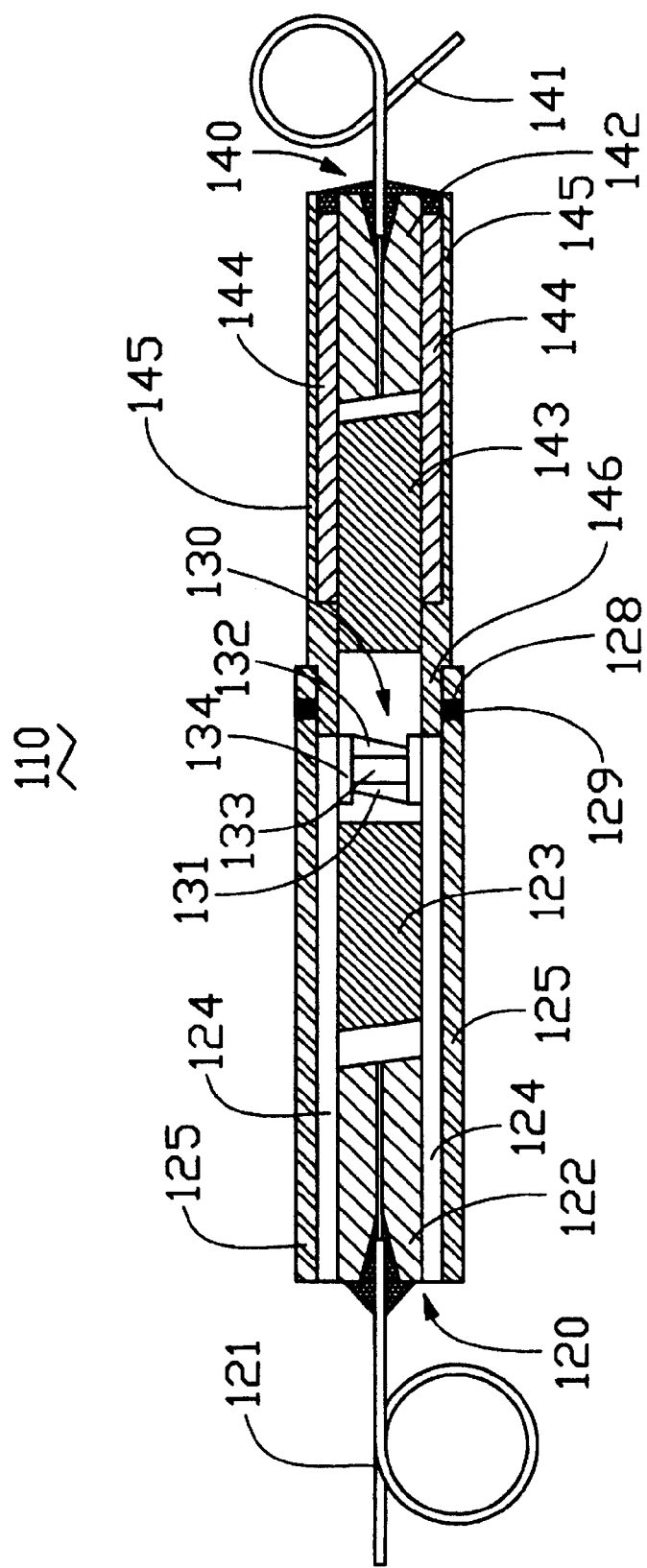
FIG. 3 is an exploded view of FIG. 2.

Also referring to FIG. 3, the first collimator 120 and the optical rotator 130 are retained in a first stainless steel sleeve 125 in perfect alignment with each other. The second collimator 140 is retained in a second stainless steel sleeve 145. A plurality of apertures 129 is defined in the first stainless steel sleeve 125 proximate an end of the sleeve 125. A circumferential recess is formed on an outside surface of the second stainless steel sleeve 145 thereby forming a diameter reduced end portion 146 having a circumferential shoulder 147. The end portion 146 of the second stainless steel sleeve 145 is snugly received in the end of the first stainless steel sleeve 125 where the apertures 129 are formed with the end portion 146 underlapping the apertures 129. The circumferential shoulder 147 serves as a stop when the second stainless steel sleeve 145 is inserted into the first stainless steel sleeve 125 for properly positioning the second stainless steel sleeve 145 with respect to the first stainless steel sleeve 125.

Welding 128 is formed through the apertures 129 for permanently securing the second stainless steel sleeve 145 to the first stainless steel sleeve 125.

Since the isolation assembly 130 is retained in the first stainless steel sleeve 125 together with the first collimator 120, the structure of the optical isolator 110 is simplified as compared to the conventional optical isolators. The assembly process is thus also simplified.

Figure 4:
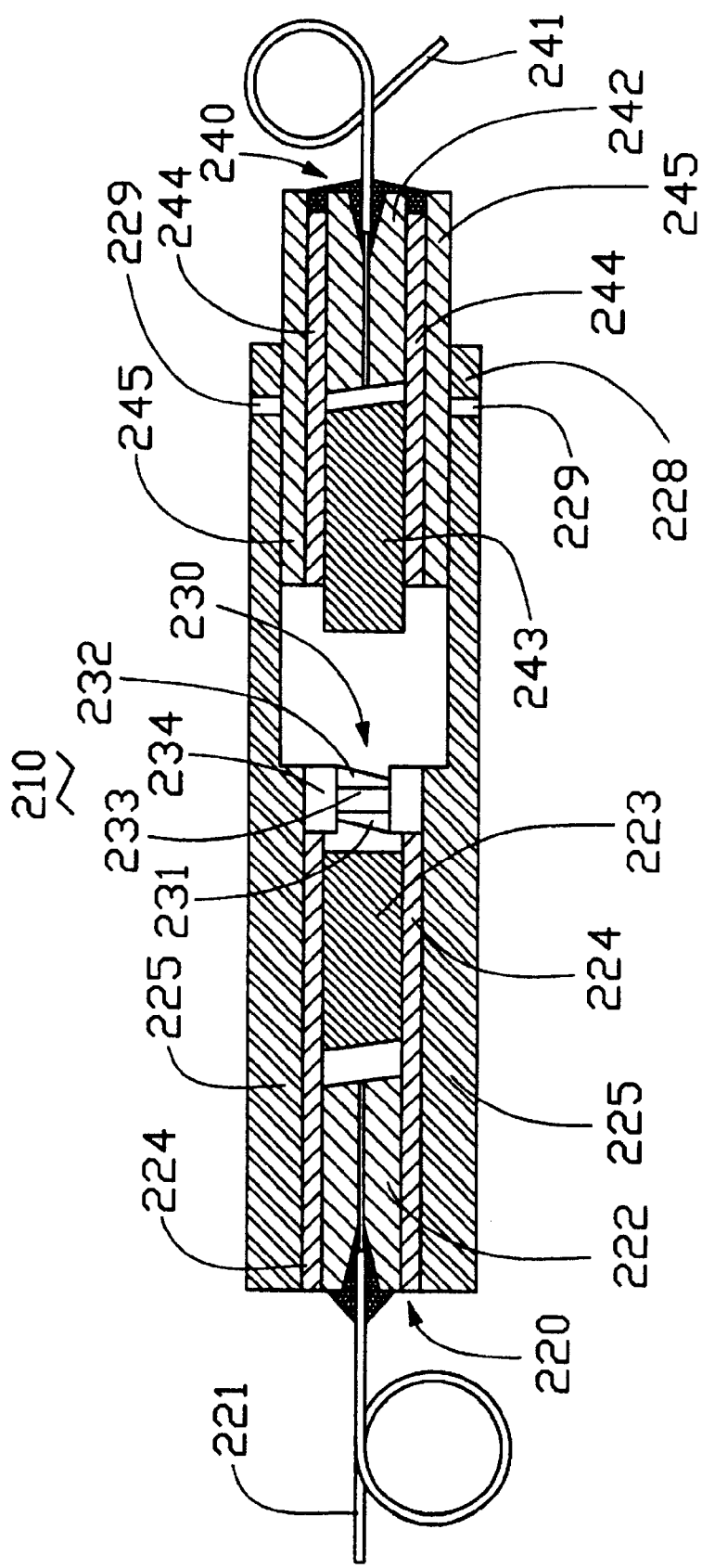
FIG. 4 is a cross-sectional view of an optical isolator constructed in accordance with an alternate embodiment of the present invention.

FIG. 4 shows an optical isolator in accordance with an alternate embodiment of the present invention generally designated with reference numeral 210. A third stainless sleeve 225 defines first and second passages (not labeled) in communication with each other, wherein the first passage is of a smaller diameter than the second passage. A third collimator 220 and an isolation assembly 230 are retained in the first passage, and a fourth stainless sleeve 245 retaining a fourth collimator 240 is inserted and snugly received in the second passage of the third stainless steel sleeve 225. A plurality of apertures 229 is defined in the third stainless sleeve 225 proximate an end of the sleeve 225 where the fourth and third stainless sleeves 245 and 225 are overlapped. Welding is formed through the aperture 229 for permanently securing the fourth stainless sleeve 245 to the third stainless sleeve 225.

Compared with optical isolator of the first embodiment, the structure of the optical isolator 210 is also simplified and easily assembled.

Although the present invention has been described through specific terms, it should be noted here that the described embodiment is not necessarily exclusive and that various changes and modifications may be imparted thereto without departing from the scope of the invention which is limited solely by the appended claims.

What is claimed is:

1. An optical isolator adapted to be mounted in a path between a first optical fiber and a second optical fiber, the optical isolator comprising:
   a first collimating assembly comprising a first sleeve for holding the first optical fiber, a first GRIN lens and a first capillary;
   an isolating assembly being retained in the first sleeve of the first collimating assembly;
   a first holding member receiving and retaining the first sleeve of the first collimating assembly, wherein the first holding member further defining at least one aperture;

a second collimating assembly;

a second holding member receiving and retaining the second collimating assembly, the second holding member comprising an end portion which is received in an end of the first holding member and underlaps the aperture; and securing means through the aperture of the first holding member for securing the second holding member to the first holding member.

2. The optical isolator according to claim 1, wherein the second collimating assembly comprises a second capillary for holding the second optical fiber, a second GRIN lens and a second glass sleeve.

3. The optical isolator according to claim 1, wherein the securing means comprises welding for securing the second holding member to the first holding member.

4. The optical isolator according to claim 1, wherein the end portion of the second holding member has a reduced diameter for being fit into the first holding member and forms a circumferential shoulder for properly positioning the second holding member with respect to the first holding member.

5. An optical isolator comprising:

a first collimating assembly and an isolating assembly commonly enclosed within a first inner holding member;

a first outer holding member enclosing said first inner holding member, said first outer holding member defining a section extending beyond said first inner holding member with a first distance;

a second collimating assembly enclosed in a second inner holding member;

a second outer holding member enclosing said second inner holding member, said second outer holding member including a portion extending beyond the second inner holding member with a second distance, said portion inwardly converged to define an inner diameter similar to that of the second inner holding member, said portion also directly enclosing a part of the second collimating assembly; wherein said portion extends into an inner portion of said first outer holding member.

6. The isolator according to claim 5, wherein said portion and said section overlap with each other.

7. The isolator according to claim 6, wherein at least one aperture extends through said section to reach the portion.

8. The isolator according to claim 5, wherein the second distance is larger than the first distance.

9. The isolator according to claim 5, wherein said portion forms a circumferential shoulder abutting against an end face of the first outer holding member.

* * * * *